(12) United States Patent
Akahori

(10) Patent No.: US 6,486,388 B2
(45) Date of Patent: Nov. 26, 2002

(54) APPARATUS AND METHOD FOR CREATING FINGERING GUIDANCE IN PLAYING MUSICAL INSTRUMENT FROM PERFORMANCE DATA

(75) Inventor: Shigeki Akahori, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/947,638

(22) Filed: Sep. 6, 2001

(65) Prior Publication Data

US 2002/0026865 A1 Mar. 7, 2002

(30) Foreign Application Priority Data

Sep. 6, 2000 (JP) .......................... 2000-270690

(51) Int. Cl.[7] .............................................. G09B 15/08
(52) U.S. Cl. ....................... 84/478; 84/485 R
(58) Field of Search .................. 84/467, 470 R, 84/477 R, 478, 485 R

(56) References Cited

U.S. PATENT DOCUMENTS

| | | | |
|---|---|---|---|
| 6,025,551 A | | 2/2000 | Munekawa et al. ....... 84/477 R |
| 6,066,791 A | * | 5/2000 | Renard et al. ............ 84/477 R |
| 6,084,167 A | * | 7/2000 | Akimoto et al. .......... 84/477 R |
| 6,087,577 A | * | 7/2000 | Yahata et al. ......... 84/470 R X |
| 6,281,422 B1 | * | 8/2001 | Kawamura ............ 84/477 R X |
| 2001/0014440 A1 | * | 8/2001 | Oyama et al. |
| 2001/0029829 A1 | * | 10/2001 | Moe |

FOREIGN PATENT DOCUMENTS

| | | |
|---|---|---|
| JP | 7-261750 | 10/1995 |
| JP | 10-39739 | 2/1998 |

* cited by examiner

Primary Examiner—Jeffrey Donels
(74) Attorney, Agent, or Firm—Rossi & Associates

(57) ABSTRACT

Performance data for a musical instrument having note designating keys are provided representing a sequence of notes which constitute a length of musical performance. The performance data are analyzed, and based on the analyzed performance data, fingering data are then created representing fingers to be used for operating keys among the note designating keys to designate the respective ones of the sequence of notes. Fingering hand image data are then created representing fingering hand images including fingers to be used for operating keys for the sequence of notes. Finally, a display screen exhibits the fingers to be used for the sequence of notes based on the fingering image data. The screen displays a musical score, a range of keyboard and fingering hand profiles. The size of the fingering hand is preferably made different between the indication of key depressions and the indication of key release.

18 Claims, 11 Drawing Sheets

Fig. 2a

TBLA(TR,SC)

| KTYP \ FN | W/W 0 | W/B 1 | B/W 2 | B/B 3 |
|---|---|---|---|---|
| 1 | 2 | 2 | 3 | 2 |
| 2 | 3 | 6 (TN) | 3 | 3 |
| 3 | 7 (TN) | 1 | 4 | 4 |
| 4 | 1 | 1 | 5 | 5 |
| 5 | 2 | 2 | 2 | 2 |

Fig. 2b

TBLB(TN)

| SC \ UD | 0 | 1 |
|---|---|---|
| 0 | 1 | 3 |
| 1 | 1 | 3 |
| 2 | 1 | 3 |

Fig. 3a  Basic Performance Data File
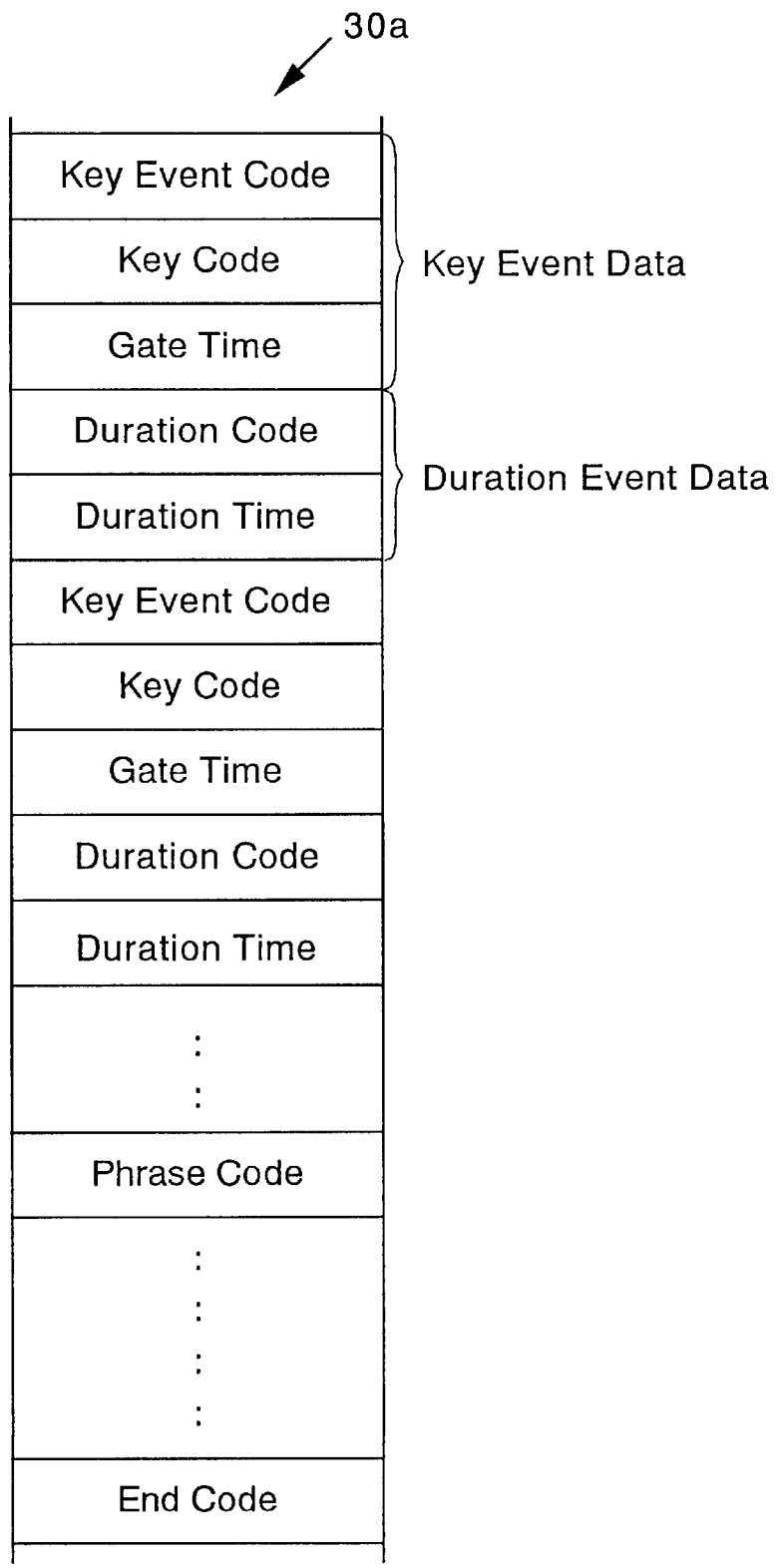

Fig. 3b Performance Data File with Character Data
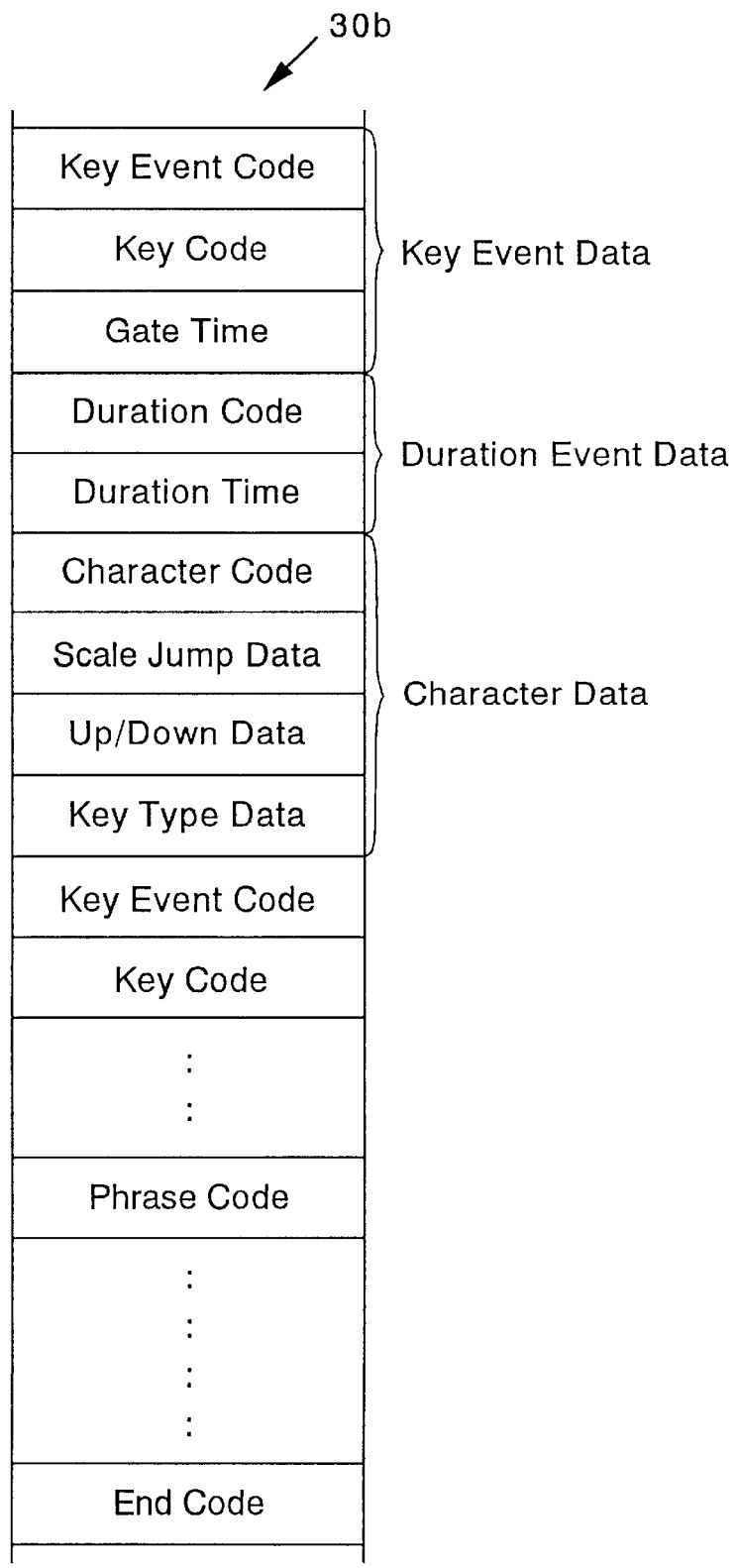

Fig. 3c Performance Data File with Fingering Data
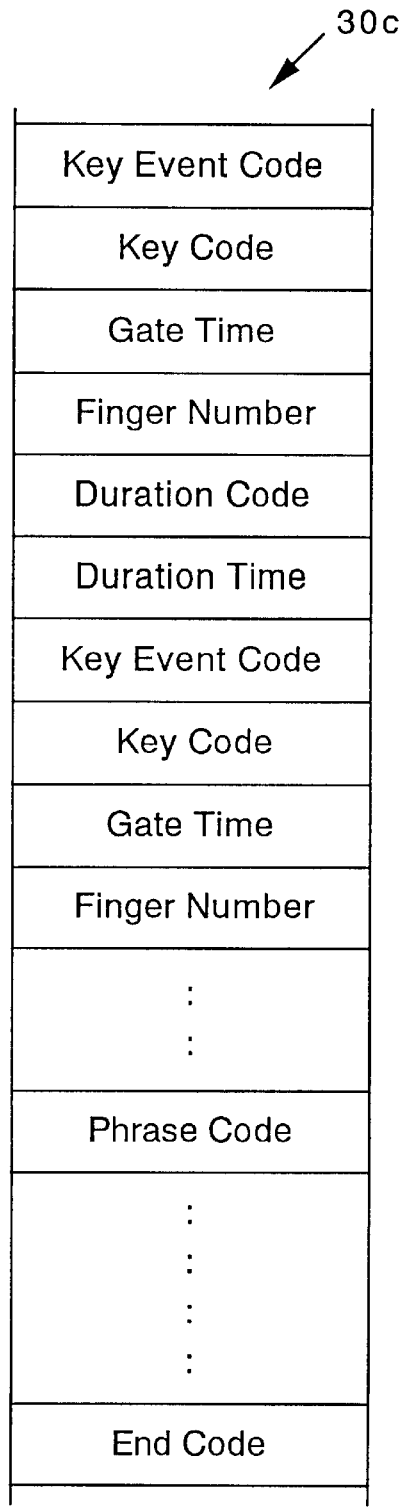

Fig. 5a At Key Depression
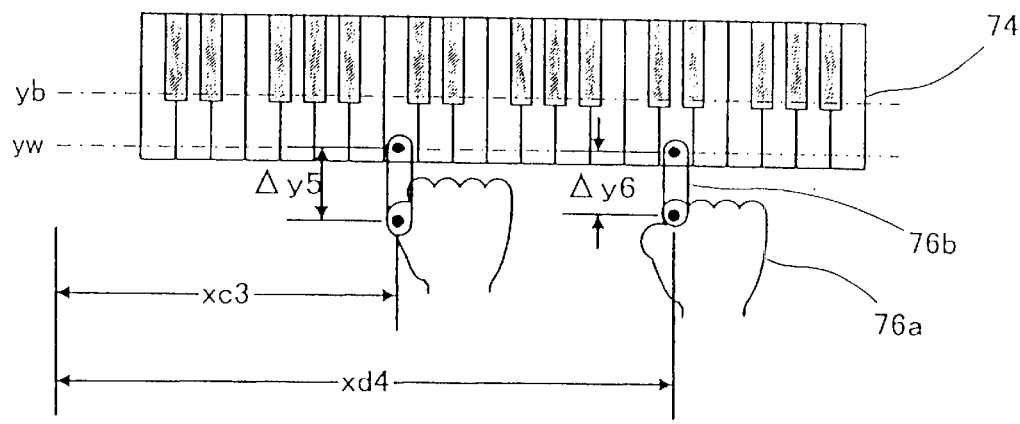
Fig. 5b At Key Release
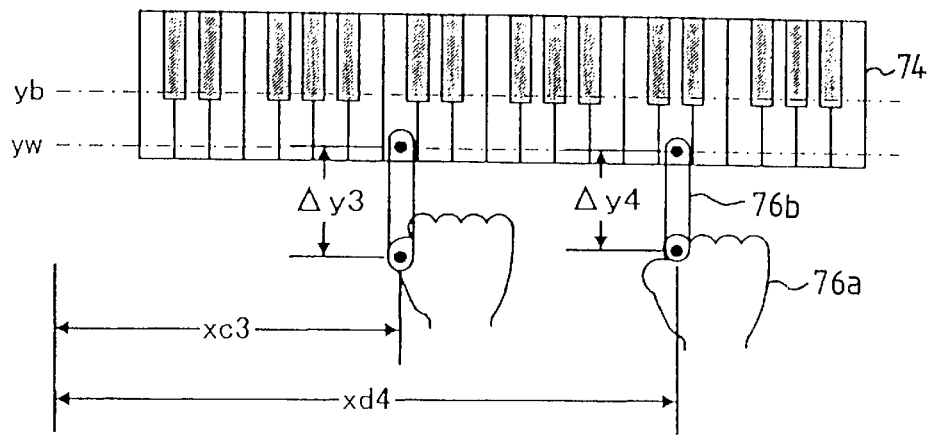
Fig. 5c From Key Release to Another Key Depression
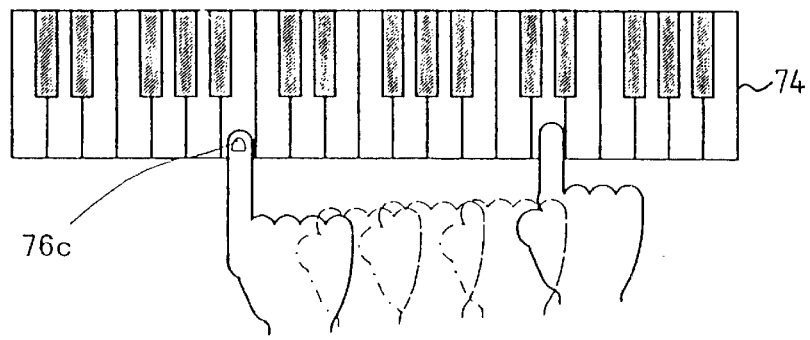

APPARATUS AND METHOD FOR CREATING FINGERING GUIDANCE IN PLAYING MUSICAL INSTRUMENT FROM PERFORMANCE DATA

This application claims priority from Japanese Patent Application No. 2000-270690, filed Sep. 6, 2000, the contents of which are incorporated hereinto by this reference.

BACKGROUND OF THE INVENTION

1. Field of the Invention

The present invention relates to an apparatus and a method for creating fingering guidance in playing musical instrument, and a machine readable medium containing program instructions for realizing such an apparatus and a method, and more particularly to an apparatus and a method for creating fingering data based on the performance data to exhibit fingering hand images and fingering numbers on the display screen as a guidance for a musical instrument player telling which keys to play i.e. to actuate and which fingers to use therefor.

2. Description of the Prior Art

In an electronic musical instrument such as of a keyboard type, it is convenient for the player, if a guidance is exhibited or presented on a display screen as to which keys to actuate and which fingers to use. In this connection, there have been proposed various ideas and devices for presenting fingering instructions. For example, unexamined JP patent publication No. H7-261750 discloses an idea of creating fingering data with respect to a plurality of keys to be actuated sequentially according to the note pitch differences between the consecutively actuated keys and the types (white or black) of the consecutively actuated keys, and displaying fingering instructions based on the created fingering data. The fingering instructions are presented by, for instance, exhibiting finger numbers on the indicators provided in the vicinity of the respective keys or by lighting lamps in colors corresponding to the fingering indications. Further, unexamined JP patent publication No. H10-39739 discloses an idea of preparing fingering data beforehand, creating finger motion data based on the fingering data, and displaying animated finger images on the screen.

Among the prior art devices, a device such as shown in the above-mentioned unexamined JP patent publication No. H7-261750 presents the fingering instructions by simple indications like numerals or colored lamps, which may not be intuitive for the user to grasp the fingering. A device such as shown in the above-mentioned unexamined JP patent publication No. H10-39739 presents the fingering instructions by complicated images and may not be suitable for exhibiting fingering images in real time based on performance data having no fingering date therein.

SUMMARY OF THE INVENTION

It is, therefore, an object of the present invention to solve the prior art disadvantages and to provide a fingering guidance creating device and method which will present fingering instructions by intuitive indications for the user through uncomplicated processing. The invention is to further provide a storage medium storing a program that is executable by a computer to configure such a device and method.

According to the present invention, the object is accomplished by providing an apparatus for creating fingering guidance in playing a musical instrument having note designating keys, the apparatus comprising: a performance data providing module which provides performance data representing a sequence of notes which constitute a length of musical performance; a fingering data creating module which analyzes the performance data and creates fingering data representing fingers to be used for operating keys among the note designating keys to designate the respective ones of the sequence of notes; a fingering image creating module which creates image data representing fingering images which include the fingers to be used for operating keys for the sequence of notes; and a display device which exhibits the images of the fingers to be used for the sequence of notes based on the image data.

According to an aspect of the present invention, each of the fingering images includes: a key range image depicting a range of the note designating keys; a hand image depicting a shape of a hand to be located at a position as determined based on the performance data representing a note to be played among the sequence of notes and on the fingering data; and a finger image depicting a shape of a finger to be placed between the note designating a key corresponding to a note to be played in the range of the keys and the shape of the hand based on the fingering data.

According to another aspect of the present invention, the fingering guidance creating apparatus may further comprise a performance data advancing module which advances the performance data for analysis according to progression of the performance.

According to a further aspect of the present invention, the fingering data creating module analyzes the performance data fraction by fraction of the length of musical performance and creates the fingering data for every fractional length of the musical performance, the analysis and creation needing a certain length of time for the fractional length of the musical performance; and the fingering guidance creating apparatus further comprises: a delaying module which delays the performance data for the fractional length of the musical performance by an amount of time equal to the certain length of time needed; and a tone signal generating module which generates tone signals for the fractional length of the musical performance based on the delayed performance data.

According to a still further aspect of the present invention, the fingering image creating module creates a first type of fingering data which represents a first type of finger image having a first length and not having a nail mark to be exhibited for indicating a note designating key to be depressed, while the fingering image creating module further creates a second type of fingering data which represents a second type of finger image having a second length which is greater than the first length and having a nail mark to be exhibited for indicating a note designating key to be released.

According to a still further aspect of the present invention, the fingering image creating module further creates a third type of fingering data which represents a third type of finger image having a third length which is greater than the first length and is less than the second length to be exhibited a predetermined time length in advance to the exhibition of the first type of finger image and to the exhibition of the second type of finger image.

According to the present invention, the object is further accomplished by providing a method for creating fingering guidance in playing a musical instrument having note designating keys, the method comprising: a step of providing performance data representing a sequence of notes which constitute a length of musical performance; a step of creating fingering data representing fingers to be used for operating keys among the note designating keys to designate the respective ones of the sequence of notes based on analysis of the performance data; a step of creating image data representing fingering images which include the fingers to be used for operating keys for the sequence of notes; and a step of displaying the images of the fingers to be used for the sequence of notes based on the image data.

According to a still further aspect of the present invention, the fingering guidance creating method may further comprise a step of advancing the performance data for analysis according to progression of the performance.

According to a still further aspect of the present invention, the step of creating fingering data analyzes the performance data fraction by fraction of the length of musical performance and creates the fingering data for every fractional length of the musical performance, the analysis and creation needing a certain length of time for the fractional length of the musical performance; and the method further comprises: a step of delaying the performance data for the fractional length of the musical performance by an amount of time equal to the certain length of time needed; and a step of generating tone signals for the fractional length of the musical performance based on the delayed performance data.

According to a still further aspect of the present invention, the step of creating image data creates a first type of fingering data which represents a first type of finger image having a first length and not having a nail mark to be exhibited for indicating a note designating key to be depressed, while the step of creating image data further creates a second type of fingering data which represents a second type of finger image having a second length which is greater than the first length and having a nail mark to be exhibited for indicating a note designating key to be released.

According to a still further aspect of the present invention, the step of creating image data further creates a third type of fingering data which represents a third type of finger image having a third length which is greater than the first length and is less than the second length to be exhibited a predetermined time length in advance to the exhibition of the first type of finger image and to the exhibition of the second type of finger image.

According to the present invention, the object is still further accomplished by providing a storage medium storing a program that is executable by a computer for creating fingering guidance in playing a musical instrument having note designating keys, the program comprising: a module for providing performance data representing a sequence of notes which constitute a length of musical performance; a module for creating fingering data representing fingers to be used for operating keys among the note designating keys to designate the respective ones of the sequence of notes based on analysis of the performance data; a module for creating image data representing fingering images which include the fingers to be used for operating keys for the sequence of notes; and a module for displaying the images of the fingers to be used for the sequence of notes based on the image data.

According to a still further aspect of the present invention, the program may further comprise a module for advancing the performance data for analysis according to progression of the performance.

According to a still further aspect of the present invention, the module for creating fingering data is to analyze the performance data fraction by fraction of the length of musical performance and to create the fingering data for every fractional length of the musical performance, the analysis and creation needing a certain length of time for the fractional length of the musical performance; and wherein the program further comprises: a module for delaying the performance data for the fractional length of the musical performance by an amount of time equal to the certain length of time needed; and a module for generating tone signals for the fractional length of the musical performance based on the delayed performance data.

According to a still further aspect of the present invention, the module for creating image data is to create a first type of fingering data which represents a first type of finger image having a first length and not having a nail mark to be exhibited for indicating a note designating key to be depressed, while the module for creating image data is to further create a second type of fingering data which represents a second type of finger image having a second length which is greater than the first length and having a nail mark to be exhibited for indicating a note designating key to be released.

According to a still further aspect of the present invention, the module for creating image data is to further create a third type of fingering data which represents a third type of finger image having a third length which is greater than the first length and is less than the second length to be exhibited a predetermined time length in advance to the exhibition of the first type of finger image and to the exhibition of the second type of finger image.

According to the present invention, the performance data may be provided by a recorded medium, or by an apparatus automatically generating performance data of a musical piece according to some application software containing a music composing algorithm, or further may be downloaded from a server computer via a communication network.

According to the present invention, therefore, a clear fingering guidance for the player will be created for the user intending to play the musical instrument.

BRIEF DESCRIPTION OF THE DRAWINGS

For a better understanding of the present invention, and to show how the same may be practiced and will work, reference will now be made, by way of example, to the accompanying drawings, in which:

FIGS. 2a and 2b are charts showing the data structure of fingering tables;

FIGS. 3a, 3b and 3c are charts showing the data structure of three kinds of performance data files, respectively, processed in the embodiment of the present invention;

FIGS. 5a, 5b and 5c are illustrations, each of a composite image of a fingering hands in connection with a keyboard;

DESCRIPTION OF THE PREFERRED EMBODIMENTS

1. Hardware Configuration

Figure 1:
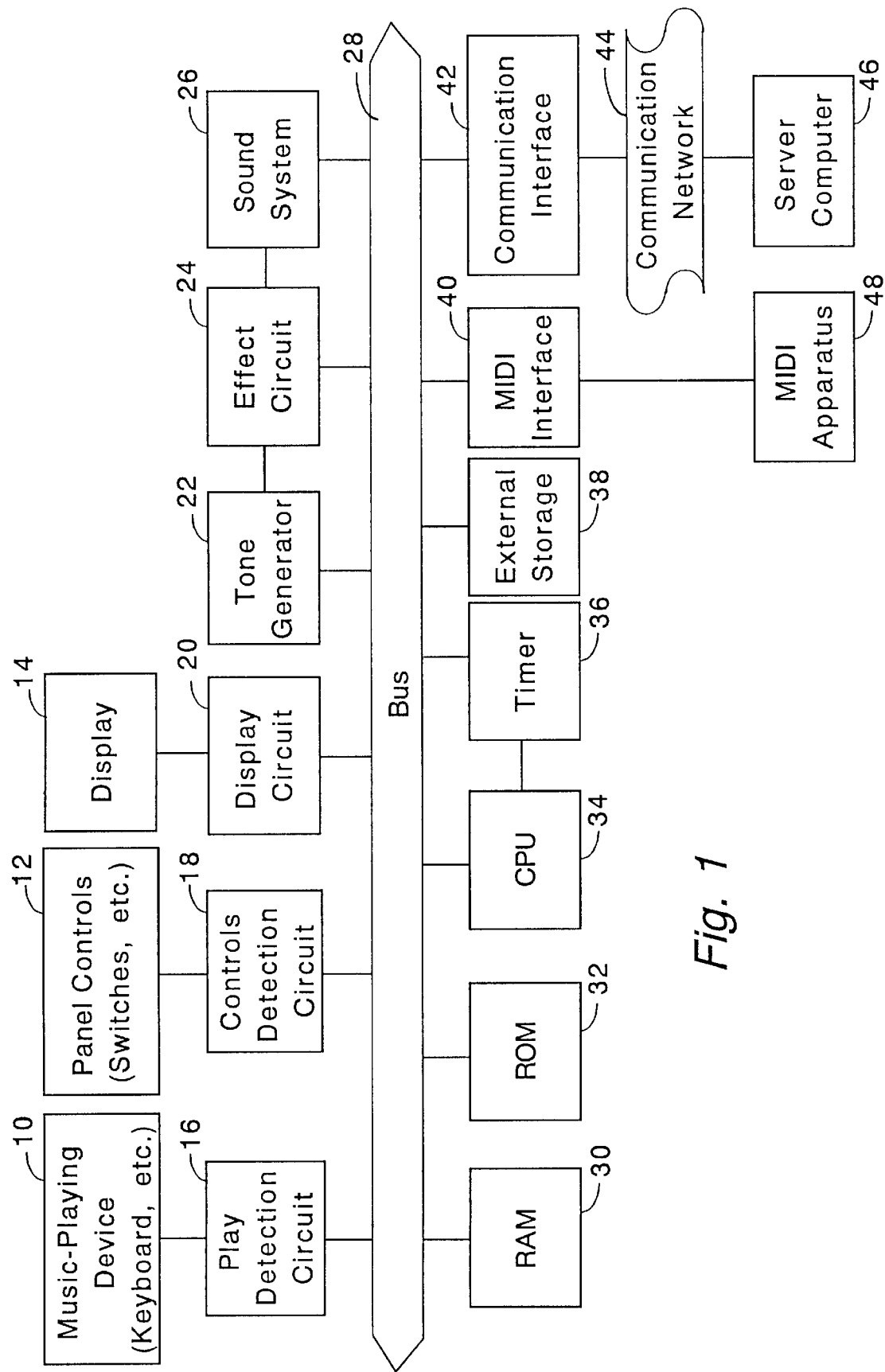
FIG. 1 is a block diagram showing an electronic musical instrument as an embodiment of a fingering guidance creating apparatus according to the present invention.

FIG. 1 shows a block diagram of the hardware structure of an electronic musical instrument as an embodiment of an apparatus according to the present invention for creating a fingering guidance in playing the musical instrument from the performance data. The illustrated apparatus comprises a music-playing device 10 including a keyboard and pedals for playing music; a play detection circuit 16 for detecting the operating conditions of the music-playing device 10; panel controls 12 such as a power switch, an automatic performance start/stop switch, a fingering image display switch and a key actuation range image display switch; and a controls detection circuit 18 for detecting the respective conditions of the switches. Further comprised in the apparatus, is a display device 14 such as of a liquid crystal panel having a resolution of 1024×768 pixels. The display device 14 may be of another type such as a CRT, and the resolution may be higher or lower. A display circuit 20 is connected between the display device 14 and a bus 28 for controlling the display device 14 to exhibit various images and indications based on display commands and data supplied via the bus 28. A tone generator circuit 22 is to synthesize musical tone signals based on the music-performance data supplied via the bus 28. The type or fashion of the tone generator may be a wave memory type, a physical model type, an FM synthesis type, a harmonics synthesis type, a formant synthesis type, an analog synthesizer type having VCOs, VCFs and VCAS, or any other type available in the art. An effect circuit 24 is to process the tone signals synthesized by the tone generator circuit 22 to impart various sound effects. A sound system 26 includes an amplifier and a loudspeaker, and produces audible sounds according to the tone signals outputted from the effect circuit 24.

A central processing unit (CPU) 34 controls the respective parts of the keyboard electronic musical instrument based on the control program stored in a read-only memory (ROM) 32, conducting data processing using a random access memory (RAM) 30 as work areas for the data processing. The ROM 32 further stores data elements for various image pieces to be exhibited on the display screen 14. A timer 34 is to generate timing pulses or clock pulses which are supplied to the CPU 34 as a periodic timer interrupt signal having a predetermined time period.

An external storage device 38 is to store various musical performance data, etc. A MIDI interface 40 serves to transfer MIDI signals to and from an external MIDI apparatus 48. A communication interface 42 serves to connect the electronic musical instrument system to an external communication network for making access to a server computer 46 to perform transfer of performance data files in the format of SMF (standard MIDI file) or in other formats, and various data as well.

Figure 4A:
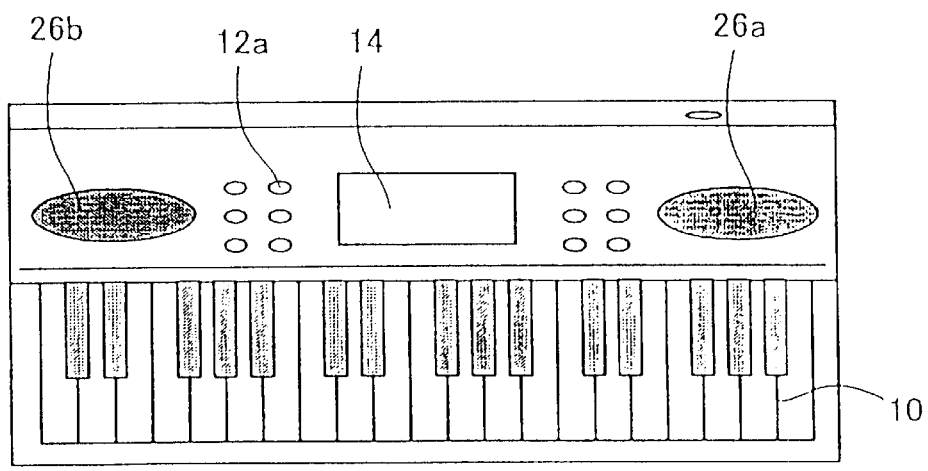
FIG. 4a is an illustration of the plan view appearance of an electronic musical instrument as an embodiment of the present invention.

The electronic musical instrument assumes, as an example, a plan view appearance as shown in FIG. 4a. A keyboard 10 constituting the music-playing device 10 (of FIG. 1) is provided in the front half area of the instrument. In the rear half area of the instrument are provided loudspeakers 26a and 26b of the sound system 26 (of FIG. 1) near the right and the left side end, a display panel 14 constituting the display device 14 (of FIG. 1) in the center, and switches of the panel controls 12 (of FIG. 1) in-between. The switch 12a represents the above-mentioned fingering image display switch.

Figure 4B:
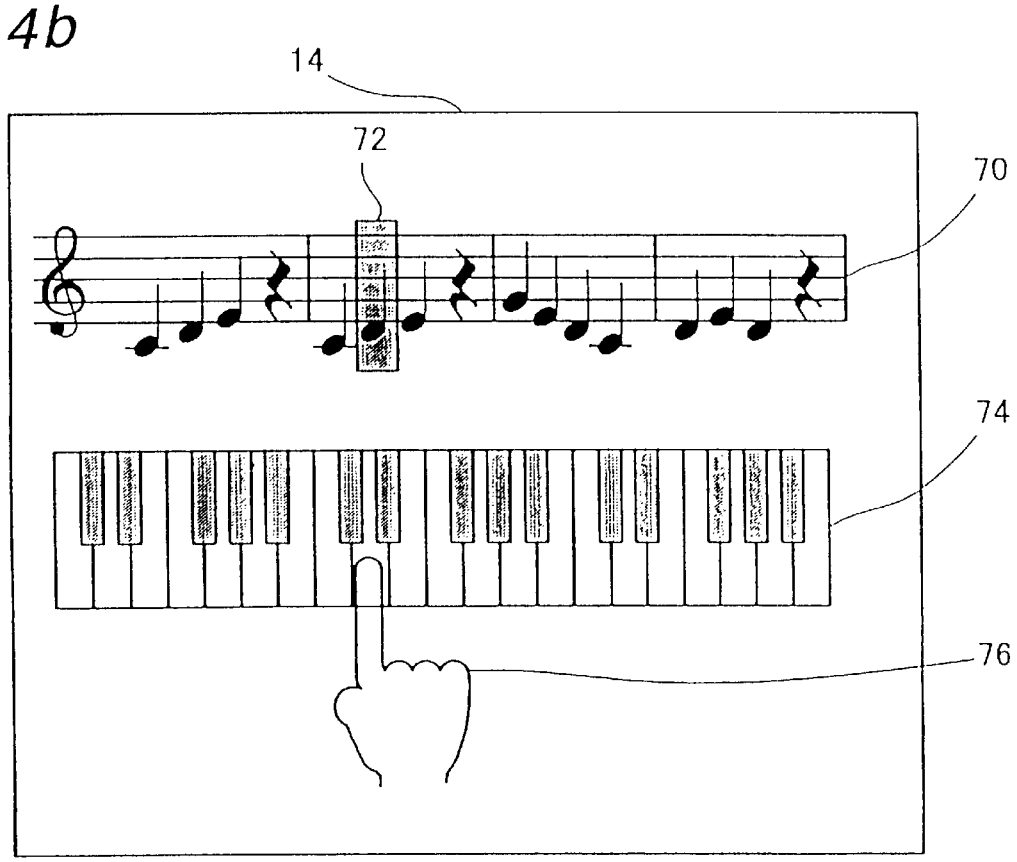
FIG. 4b is an illustration of a display screen exhibiting an example of the fingering guidance according to the present invention.

FIG. 4b illustrates an example of the fingering guidance exhibited on the display screen 14. An image of a musical score 70 is presented based on the performance data as read out (and played back) from the external storage device 38. Along the musical score image 70, a cursor 72 is exhibited at the current note which corresponds to the key event being now played back. A keyboard image 74 is formed to schematically show the keyboard covering the key range which includes the key events being played back. A fingering hand image 76 is formed to pictographically exhibit a player's hand, and points the key in the keyboard image 74 corresponding to the note denoted by the cursor 72.

2. Data Structure

2-1. Basic Performance Data

An explanation will now be made with respect to data structures employed in the processing in the embodiment of the present invention. The supplied MIDI signals generally contains performance data for a plurality of performance parts, and the performance data of each performance part is converted into a format of basic performance data file as shown in FIG. 3a automatically according to necessity. The basic performance data file mainly comprised of key event data and duration event data respectively representing note pitches and note lengths to constitute a melody, and further includes phrase codes representing demarcation between the musical phrases and an end code representing the end of the musical piece. In the case where an original performance data file is given in the SNF (standard MIDI file) format, the SMF format is different from the format shown in FIG. 3 a and needs the data file format conversion in the shown embodiment, but the format for the basic performance data file may be otherwise determined to meet another format such as the SMF format. The key event data consists of a key event code, a key code and a gate time, wherein the key event code indicates that the group of data is the key event data concerning note designation by the key actuation, the key code indicates the pitch of the note designated by the key and the gate time represents the length of time of the key being "on", i.e. the time period from the key-on point to the key-off point. The duration event data consists of a duration code and a duration time, wherein the duration code indicates that the group of data is the duration event data concerning note notation as described on a musical score and the duration time represents the length of a note in musical notation, i.e. the time length from the start of the note till the start of the succeeding note. Each pair of key event data and duration event data defines each note in a series of notes constituting a melody or tune (a musical progression).

2-2. Performance Data with Character Data

The above-obtained basic performance data file is further converted into a performance data file with character data as shown in FIG. 3b through processing to be described hereinafter. The performance data file with character data contains all of the key event data and all of the duration event data contained in the basic performance data file of FIG. 3a, and further contains the character data inserted among these event data where appropriate. The character data is also a group of data, and consists of a character code, a scale jump data piece SC, an up/down data piece UD and a key type data piece KTYP. The character code indicates that the group of data is the character data. The remaining data pieces will be described in more detail hereunder.

The scale jump data SC is a data piece to represent the amount of pitch difference between a consecutive pair of notes, i.e. two adjacent notes of concern. Let us take the key code (e.g. in terms of MIDI note number) in the key event data immediately before the character data group in question as being KC1, and the key code in the key event data immediately after the character data group in question as being KC2. If $|KC2-KC1|=<2$, then set SC=0. If $3=<|KC2-KC1|=<11$, then set SC=1. If $12=<|KC2-KC1|$, then set SC=0.

The up/down data UD represents the direction of pitch variation between a consecutive pair of notes. Thus, if KC2>=KC1, then set UD=0; and if KC2<KC1, then set UD=1.

The key type data KTYP represents the types (white or black) of the keys of a consecutive pair of notes. In the case where both the KC1 key and the KC2 key are white keys, then set KTYP=0. In the case where the KC1 key is a white key and the KC2 key is a black key, then set KTYP=1. In the case where the KC1 key is a black key and the KC2 key is a white key, then set KTYP=2. Finally, in the case where both the KC1 key and the KC2 key are black keys, then set KTYP=3.

2-3. Performance Data File with Fingering Data

The above-obtained performance data file with character data is further converted into a performance data file with fingering data as shown in FIG. 3c through processing to be described hereinafter. The performance data file with fingering data contains all of the key event data and all of the duration event data contained in the basic performance data file of FIG. 3a, and further contains a finger number data piece inserted just after every event data group, while the character data groups have been deleted from the data file of FIG. 3b. The finger number data indicates the finger to be used for depressing the key of the note as defined by the key event data placed just before the fingering data.

2-4. Fingering Table

In order to determine the finger numbers to be contained in the above-described performance data file with fingering data, the ROM 32 stores a first and second fingering tables TBLA and TBLB as shown in FIGS. 2a and 2b, respectively. The first fingering table TBLA is comprised of a plurality of subtables TBLA(TR,SC)'s, each corresponding to each combination of a track number TR (the "track" means the above-mentioned "performance part") and the scale jump data SC. Each of the subtables stores the finger numbers for the succeeding keys, each finger number being determined by each combination of the key type KTYP and the preceding finger number FN with respect to all the key types KTYP's and all the preceding finger numbers FN's. In the subtables TBLA(TR,SC)'s of FIG. 2a, the listed finger numbers which are greater than "5" are subtable numbers TN's of the subtables TBLB(TN)'s in the second fingering table TBLB shown in FIG. 2b. The finger numbers indicate fingers as follows: "1" indicates a thumb, "2" indicates a index finger, "3" indicates a middle finger, "4" indicates a ring finger and "5" indicates a small finger, as are prevailing in the piano scores and the organ scores. The finger numbers thus function to indicate which fingers to use for the notes.

The second fingering table TBLB is comprised of a plurality of subtables TBLB(TN)'s as shown in FIG. 2b, each subtable corresponding to each subtable numbers TN listed in the subtables TBLA(TR,SC)'s of the first fingering table TBLA of FIG. 2a. Each of the subtables TBLB(TN)'s stores the finger numbers for the succeeding keys, each finger number being determined by each combination of the up/down data UD and the scale jump data SC. The second fingering table TBLB also includes finger numbers which are greater than "5", but such greater numbers mean that the regular fingering is impossible for playing such keys.

3. Operations 3-1. Software Module Configuration

Figure 6:
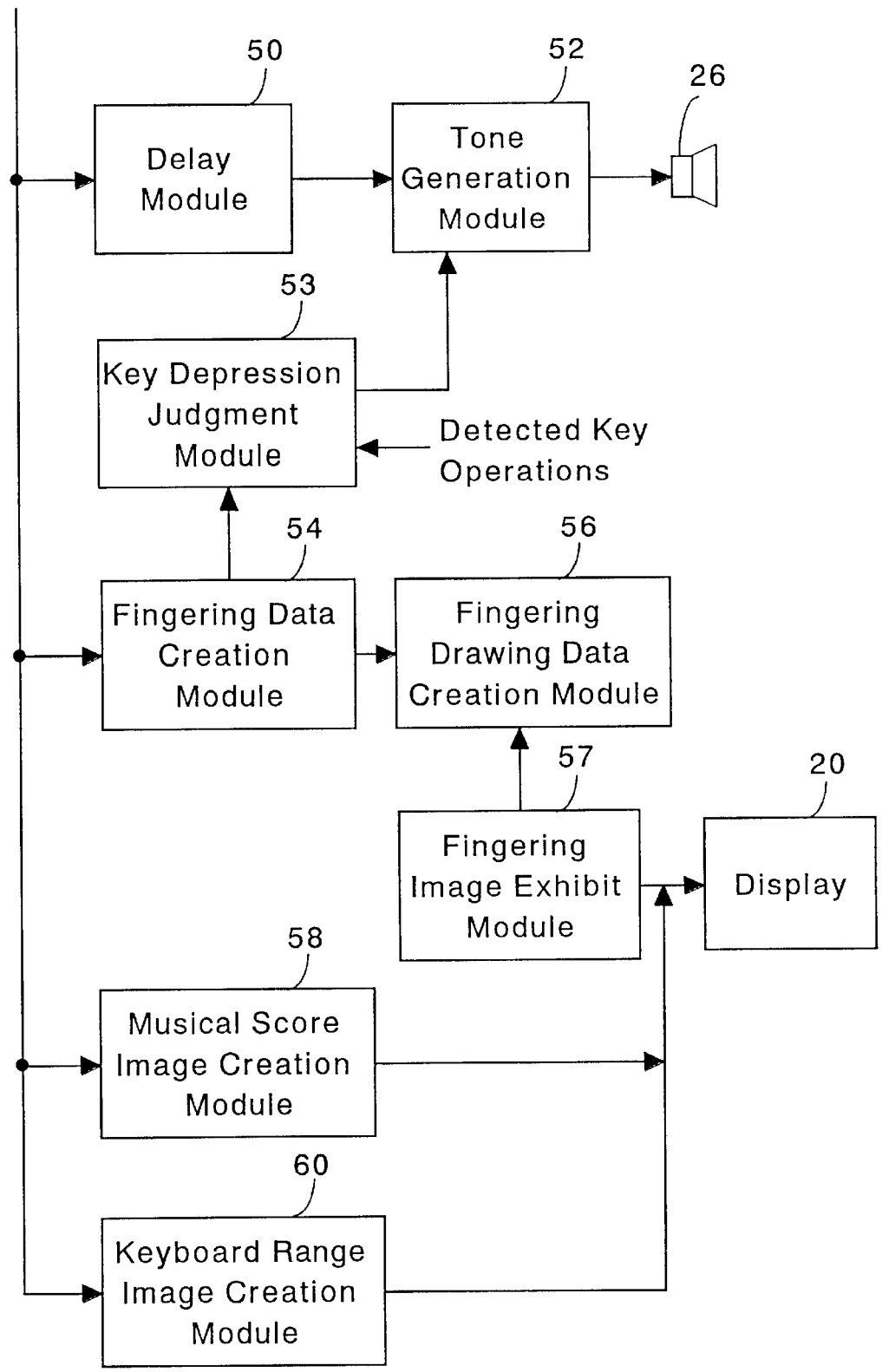
FIG. 6 is a block diagram showing a software module structure of an embodiment of the present invention.

The control program used in the above embodiment of the present invention consists of a plurality of program modules, the respective modules run in parallel in time shared operation. FIG. 6 illustrates a software module structure of an embodiment of the control program.

A module 50 is a delay module, which delays, by a predetermined amount of time, the performance data supplied from the external storage device 38, the MIDI apparatus 48 or the server computer 46. A module 52 is a tone generation module, which synthesizes tone signals based on the performance data delayed by the delay module 50. The tone signals are converted into audible sounds via the sound system 26.

A module 54 is a fingering data creation module, which creates the above-described performance data with fingering data shown in FIG. 3c. A key depression judgment module 53 receives the key operation signals from the play detection circuit 16 of FIG. 1 representing the depressions of the keys in the keyboard (music-playing device) 10 by the user and judges whether the key depressions coincide with the contents of the melody part of the supplied performance data. Only upon judgment that the two are coincident, the performance data which is referenced at the fingering data creation module 54 is advanced to the next note (i.e. key), and a performance event (containing key event data and duration event data) is generated according to the detected key operation and is supplied to the tone generation module A fingering drawing data creation module 56 is to create image drawing data which specifies a fingering hand image 76 to be exhibited on the display screen 14 based on the fingering data. The image drawing data is created earlier than the time when it is actually needed. A fingering image exhibit module 57 is to drive the display circuit 20 to exhibit the fingering hand image 76 on the display screen 14 in time with the tone generation by the performance data of the note (i.e. key) for which the fingering image is exhibited. The amount of the delay time given by the delay module 50 is set to be a length of time which corresponds to the period of time from the time when the performance data is supplied to the fingering data creation module 54 till the time when the fingering hand image 76 is supplied to the display circuit 20.

A musical score image exhibit module 58 reads the supplied performance data sooner by a certain amount than the actual performance time to create an amount of musical score data for several measures for exhibiting the musical score image 70 successively. The cursor 72 is shifted successively along the musical score image 70 in accordance with the progression of the music, i.e. the melody presented by the musical score, the cursor 72 indicating the current time position of the performance. A keyboard range image creating module 60 creates image data of the keyboard image 74 representing a range of keyboard in which the keys to be operated (actuated or depressed) are included. On the keyboard image 74, the key to be depressed now may preferably be indicated in a different manner (e.g. different color) from other keys. The operation of the modules other than the modules 54, 56 and 57 may be designed and operated using the conventional technology in the field of electronic musical instruments, and the detailed explanation thereof wir be omitted herein. The modules 54, 56 and 57 will be described in detail hereunder.

3-2. Fingering Data Creation Module 54

Figure 7:
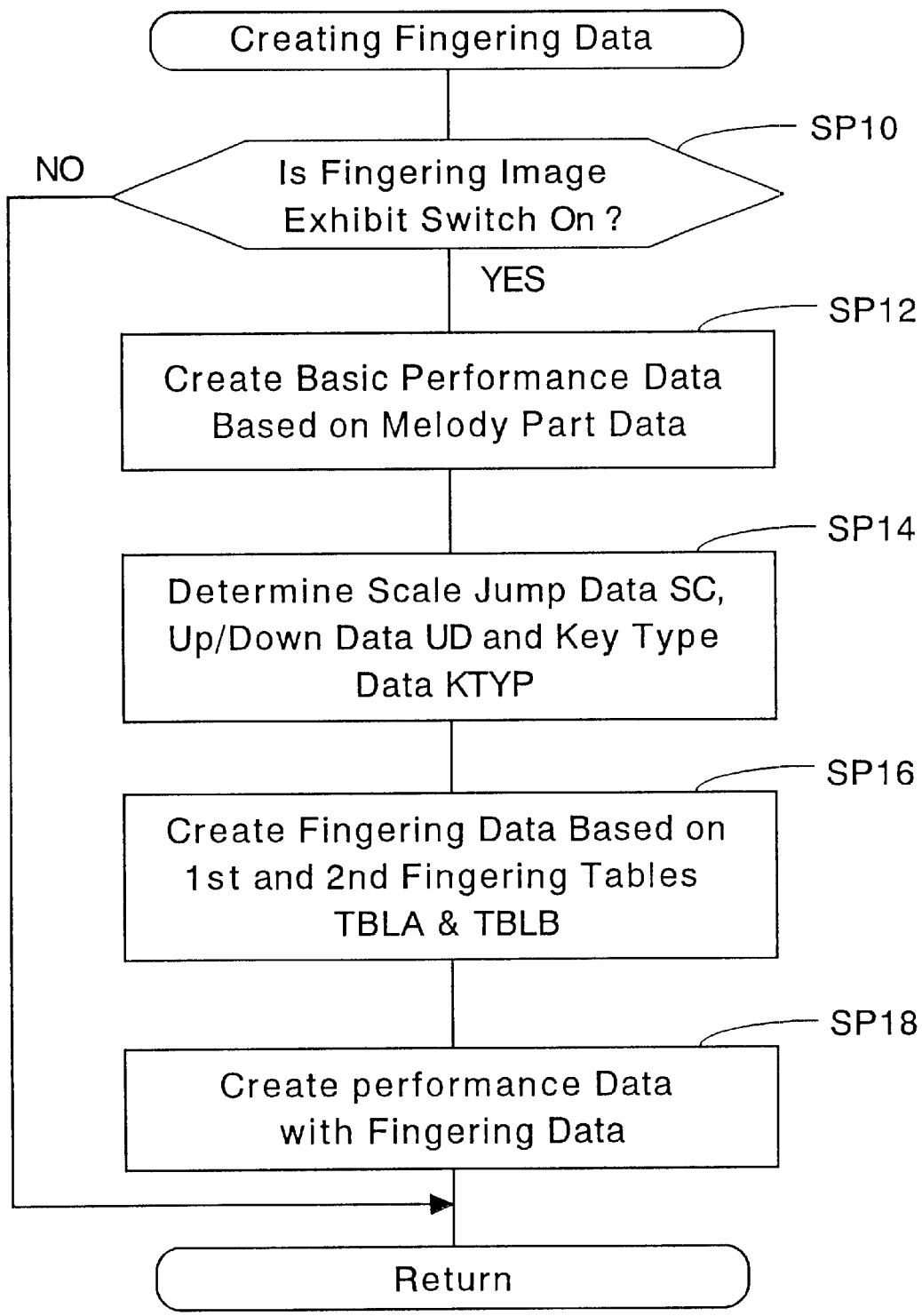
FIG. 7 is a flow chart of the fingering data creation module in FIG. 6.

The fingering data creation module 54 is a program module as shown in FIG. 7, which is executed periodically at a predetermined time interval. As the processing proceeds to a step SP10, a judgment is made as to whether the fingering image display switch 12a is turned on or not. If the judgment is "NO", the present processing module 54 is closed immediately. As the succeeding modules 56 and 57 are subject to the supply of the fingering data from the module 54, the execution of the modules 56 and 57 will not take place accordingly.

In the case where the step SP10 judges "YES", the processing moves forward to a step SP12 to detect the melody part data among the performance data, for example in the shape of MIDI signals, and to create the performance data with respect to the melody notes successively based on such melody part data to compose a basic performance data file as shown in FIG. 3a. As the processing proceeds to a step SP14, the respective key event data in the basic performance data file representing the melody part are analyzed, and then the scale jump data SC are obtained based on the pitch differences between the respective pairs of consecutive notes, the up/down data UD are obtained based on the directions of pitch variation between the respective pairs of consecutive notes, and the key type data KTYP are obtained based on the respective combination cases of the key type (white or black) of the respective pairs of consecutive notes. Thus, the performance data with character data (as shown in FIG. 3b) are obtained with respect to the range of the basic performance data created in the step SP12.

As the processing proceeds to a step SP16, the fingering data are created based on the first and second fingering tables TBLA (FIG. 2a) and TBLB (FIG. 2b) for every phrase of the performance data file with character data (FIG. 3b) as a unit of processing. The fingering data are created based on the listed contents of the first and second fingering tables TBLA and TBLB so that there will occur as less frequent finger crossings as possible. Where a finger crossing is unavoidable, such a finger crossing shall preferably occur at the end of the phrase. Then, at a step SP18, each of the created fingering data pieces is inserted immediately after the corresponding key event data piece in the basic performance data string, whereby a performance data string with fingering data (FIG. 3c) is created for the phrase under processing. The performance data with fingering data are supplied to the subsequent module 56 for the fingering drawing data creation, thus ending the present program module of the fingering data creation.

3-3. Fingering Drawing Data Creation Module 56

Figure 8:
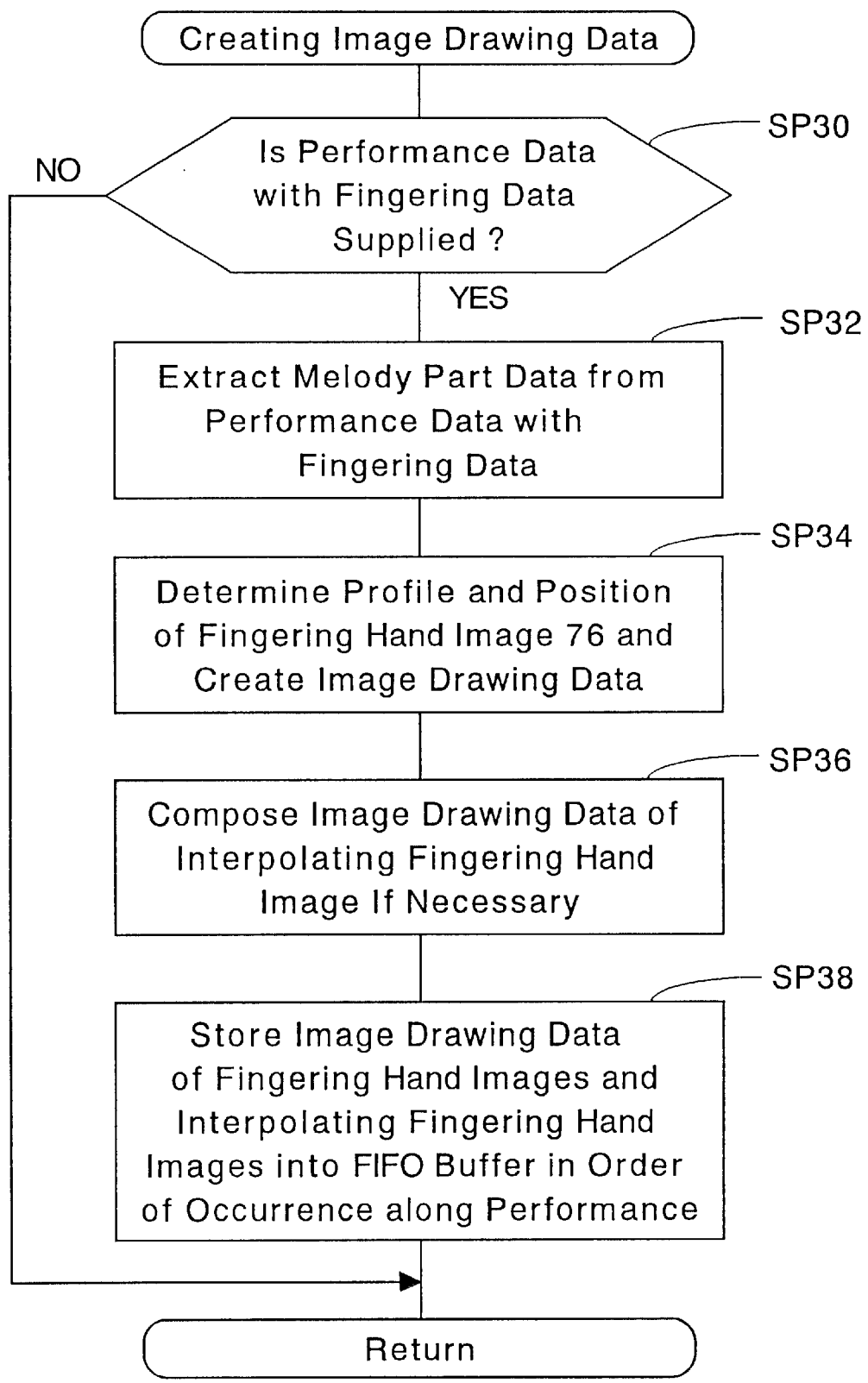
FIG. 8 is a flow chart of the fingering drawing data creation module in FIG. 6.

The operation of the fingering drawing data creation module 56 will be described hereunder. The fingering drawing data creation module 56 is a program module as shown in FIG. 8, which is executed periodically at a predetermined time interval. As the processing proceeds to a step SP30, a judgment is made as to whether the performance data with fingering data are supplied from the fingering data creation module or not. If the judgment is "NO", the present processing module is closed immediately. If the step SP30 judges "YES", the processing moves forward to a step SP32 to extract the melody part data from the performance data with fingering data.

The processing then proceeds to a step SP34, in which the profile and the position of the fingering hand image 76 at the key depression and the key release are determined for every key event based on the key code of every key event data group in the melody part performance data file and on the position data of the keyboard image 74. FIGS. 5a and 5b illustrate how the profiles and the positions are determined. The fingering hand image 76 consists of a hand image portion 76a and a finger image portion 76b. The hand image 76a is a profile of the back of a hand having five protrusions corresponding to the respective fingers. The finger image 76b is an elongated shape to be drawn between the hand image 76a and the keyboard 74.

The x component (abscissa) of the coordinate of the tip (distal end) portion of the finger image 76b is the same as the x component of the coordinate of the corresponding key in the keyboard, and therefore is uniquely determined according to the note pitch. In the examples illustrated in FIGS. 5a and 5b, the x component for the note pitch C3 is given as "xc3", and x component for the note pitch D4 is given as "xd4". The y component (ordinate) of the coordinate of tip portion of the finger image 76b is set corresponding to whether the key to be depressed is a white key or a black key. In the case of a white key, the y component of the tip portion is set to be "yw", while in the case of a black key, the y component of the tip portion is set to be "yb".

The length of the finger image 76b in the y axis direction will be determined differently in accordance with the finger name and the key actuation condition (depression or release). At the moment of key depression, the length of the finger image for the thumb is set to be "$\Delta y5$" and that for other fingers is set to be "$\Delta y6$" as shown in FIG. 5a. At the moment of key release, the length of the finger image for the thumb is set to be "$\Delta y3$" and that for other fingers is set to be "$\Delta y4$" as shown in FIG. 5b. The lengths of the finger images 76b are further contrived so that the lengths are longer at the moment of key release than at the moment of key depression, namely, $\Delta y3 > \Delta y5$ and $\Delta y4 > \Delta y6$. According to such differences between the key depression moment and the key release moment, the user can easily distinguish the depression instructions from the release instructions according to the lengths of the finger images 76b. A further contrivance would be that a nail mark (or pattern) 76c is added at the tip portion of the finger image as shown in FIG. 5c for a key release instruction. Thus, the user can more clearly distinguish the release instruction from the depression instruction.

After the coordinate of the tip portion of the finger image and the length ($\Delta y3$, $\Delta y4$, $\Delta y5$ or $\Delta y6$) of the finger image are determined, the coordinate for the root (proximal end) portion of the finger image will be determined. Then, the location of the fingering hand image 76 will be so determined that the coordinate of the root portion of the finger image coincides with the coordinate of the corresponding protrusion of the hand image 76a. Thus, the image drawing data identifying the shape and the position of the fingering hand image 76 are created. The image drawing data are a set of data including the coordinate for the exhibit location of the hand image 76a, the coordinate for the exhibit location of the tip portion of the finger image 76b, the length of the finger image 76b, depiction/non-depiction of the nail mark 76c, exhibit times for these images and exhibit specifications (depression, release, or interpolation).

Now back to FIG. 8 again, as the processing moves forward to a step SP36, the step SP36 first judges whether the presently supplied performance data with fingering data contain a key-on event represented by key event data occurring within a predetermined amount of time after the preceding key-off event. The "preceding key-off event" may be that which was included in the performance data with fingering data supplied in the past. The "predetermined amount of time" is a duration corresponding to a quarter note, for example. If the judgment is positive, the step SP36 composes image drawing data defining several fingering hand images, each consisting of only a hand image 76a, and their exhibit locations through a linear interpolation processing or else to be exhibited between the preceding key-off indication and the present key-on indication, and determines the exhibit time points of the respective interpolated fingering hand images. The number of the interpolated fingering hand images may preferably be two to five for such a period. Examples of the interpolated hand images are shown by a chain line in FIG. 5c. Next the process proceeds to a step SP 38 stores the image drawing data of the fingering hand images and interpolated fingering hand images into an FIFO buffer provided at a predetermined area in the RAM 30. Then the processing of the routine of creating image drawing data comes to an end.

3-4. Fingering Image Exhibit Module 57

Figure 9:
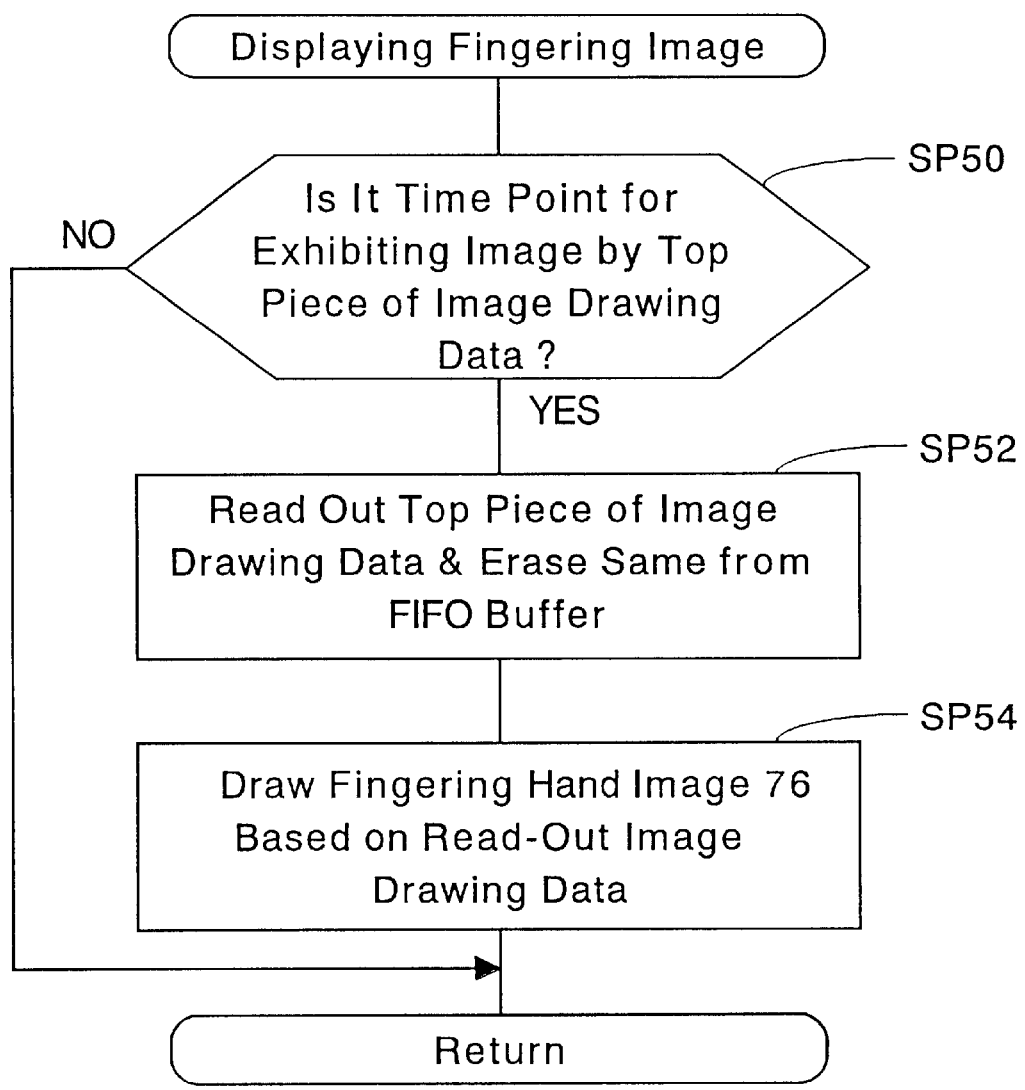
FIG. 9 is a flow chart of the fingering image exhibit module in FIG. 6.

Turning now to FIG. 9, the operation of the fingering image exhibit module 57 will be described hereinafter. The program module for the fingering image exhibit module 57 is initiated every predetermined time interval. A step SP50 refers to the above-mentioned FIFO buffer to check present time has reached the exhibit time of the top (oldest) piece of image drawing data stored in the FIFO buffer. If the judgment is "NO", the processing of the present module comes to an end immediately. If the step SP50 judges "YES", a step SP52 reads out the top piece of image drawing data and thereafter deletes the same from the FIFO buffer. Then as the processing proceeds to a step SP54, the fingering hand image 76 is drawn on the display screen 14 based on the read-out image drawing data piece in the way described below.

For the indication of the "key depression", a shorter (Δy5 or Δy6) finger image 76b is drawn between the position of the root portion of the finger to be used and the position of the key to be depressed as seen from FIG. 5a. For the indication of the "key release", a longer (Δy3 or Δy4) finger image is drawn between the position of the root portion of the finger to be used and the position of the key to be depressed as seen from FIG. 5b. In the case of the depiction of the interpolated fingering hand images, there are drawn on the display screen fingering hand images 76 having no finger image, i.e. fingering hand images, each consisting of only a hand image 76a as seen from the chain-lined profiles in FIG. 5c. Thus, the present processing routine comes to an end.

4. Modifications

Although the present invention has been described herein above with respect to the fingering guidance creation processing on a particular embodiment, the way of the fingering guidance creation processing should not be considered to be limited to the above-described embodiment, but may be variously modified according to the knowledge of those having ordinary skill in the art using commonly prevailing technology in this field as explained below.

While the present invention is practiced using software operating on an electronic musical instrument constructed with hardware components in the above-described embodiment, the respective hardware components may be configured by software of the respective functions running on a personal computer. In such cases, the software may be supplied by means of storage media such as a CD-ROM and a floppy disk carrying such software modules, or may be downloaded from a server computer via a communication network.

While the above embodiment employs the distinction between the key depression and the key release by the difference in the lengths of the finger images 76b or by the existence/non-existence of the nail mark 76c, other methods of distinction may be applicable such as changing the colors of the fingering hand image 76, changing the shape of the fingering hand image 76, and exhibiting the fingering hand image 76 only at the depression instruction and extinguishing the same at the release instruction. Other methods may also be applicable within the knowledge of a person having ordinary skill in the art.

Further, while the fingering hand images 76 of FIGS. 5a and 5b are exhibited at the moment for the key depression and the key release, respectively, the respective images may be exhibited with a finger image 76b in an intermediate size (between the depression size and the release size) at a moment, a predetermined length of time in advance of the depression time and the release time, respectively. This will work as advance notices of the key depression and the key release for the user.

According to the present invention, as the fingering data representing the key positions and the fingers to be used are created by analyzing the given performance data, and then the fingering guide images are created imitating the profile of a hand with a finger for actuating the key. The user will easily and clearly know which key to actuate by which finger accordingly.

As will be apparent from the description herein above, some of the structural element devices of the present invention are configured by a computer system performing the assigned functions according to the associated programs. They may of course be hardware structured discrete devices. Therefore, a hardware-structured device performing a certain function and a computer-configured device performing the same function should be considered a same-named device or at least an equivalent to each other.

While particular embodiments of the invention have been described, it will, of course, be understood by those skilled in the art without departing from the spirit of the invention that the invention is not limited thereto since modifications may be made by those skilled in the art particularly in light of the foregoing teachings. It will be understood that the embodiments shown in the drawings and described above are merely for illustrative purposes, and are not intended to limit the scope of the invention. It is therefore contemplated by the appended claims to cover any such modifications that incorporate those features of these improvements in the true spirit and scope of the invention.

What is claimed is:

1. An apparatus for creating fingering guidance in playing a musical instrument having note designating keys, the apparatus comprising:

a performance data providing module which provides performance data representing a sequence of notes which constitute a length of musical performance;

a fingering data creating module which analyzes said performance data and creates fingering data representing fingers to be used for operating keys among said note designating keys to designate the respective ones of said sequence of notes;

a fingering image creating module which creates image data representing fingering images which include said fingers to be used for operating keys for said sequence of notes; and a display device which exhibits said images of the fingers to be used for said sequence of notes based on said image data.

2. An apparatus for creating fingering guidance as claimed in claim 1, wherein each of said fingering images includes:

a key range image depicting a range of said note designating keys;

a hand image depicting a shape of a hand to be located at a position as determined based on said performance data representing a note to be played among said sequence of notes and on said fingering data; and a finger image depicting a shape of a finger to be placed between the note designating a key corresponding to a note to be played in said range of the keys and said shape of the hand based on said fingering data.

3. An apparatus for creating fingering guidance as claimed in claim 1, further comprising:
a performance data advancing module which advances said performance data for analysis according to progression of the performance.

4. An apparatus for creating fingering guidance as claimed in claim 1, wherein said fingering data creating module analyzes said performance data fraction by fraction of said length of musical performance and creates said fingering data for every fractional length of said musical performance, said analysis and creation needing a certain length of time for said fractional length of the musical performance; the apparatus further comprising:
a delaying module which delays said performance data for said fractional length of said musical performance by an amount of time equal to said certain length of time needed; and
a tone signal generating module which generates tone signals for said fractional length of said musical performance based on said delayed performance data.

5. An apparatus for creating fingering guidance as claimed in claim 1, wherein said fingering image creating module creates a first type of fingering data which represents a first type of finger image having a first length and not having a nail mark to be exhibited for indicating a note designating key to be depressed, while said fingering image creating module further creates a second type of fingering data which represents a second type of finger image having a second length which is greater than said first length and having a nail mark to be exhibited for indicating a note designating key to be released.

6. An apparatus for creating fingering guidance as claimed in claim 5, wherein said fingering image creating module further creates a third type of fingering data which represents a third type of finger image having a third length which is greater than said first length and is less than said second length to be exhibited a predetermined time length in advance to the exhibition of said first type of finger image and to the exhibition of said second type of finger image.

7. A method for creating fingering guidance in playing a musical instrument having note designating keys, the method comprising:
a step of providing performance data representing a sequence of notes which constitute a length of musical performance;
a step of creating fingering data representing fingers to be used for operating keys among said note designating keys to designate the respective ones of said sequence of notes based on analysis of said performance data;
a step of creating image data representing fingering images which include said fingers to be used for operating keys for said sequence of notes; and
a step of displaying said images of the fingers to be used for said sequence of notes based on said image data.

8. A method for creating fingering guidance as claimed in claim 7, wherein each of said fingering images includes:
a key range image depicting a range of said note designating keys;
a hand image depicting a shape of a hand to be located at a position as determined based on said performance data representing a note to be played among said sequence of notes and on fingering data; and
a finger image depicting a shape of a finger to be placed between the note designating a key corresponding to a note to be played in said range of the keys and said shape of the hand based on said fingering data.

9. A method for creating fingering guidance as claimed in claim 7, further comprising:
a step of advancing said performance data for analysis according to progression of the performance.

10. A method for creating fingering guidance as claimed in claim 7, wherein said step of creating fingering data analyzes said performance data fraction by fraction of said length of musical performance and creates said fingering data for every fractional length of said musical performance, said analysis and creation needing a certain length of time for said fractional length of the musical performance; the method further comprising:
a step of delaying said performance data for said fractional length of said musical performance by an amount of time equal to said certain length of time needed; and
a step of generating tone signals for said fractional length of said musical performance based on said delayed performance data.

11. A method for creating fingering guidance as claimed in claim 7, wherein said step of creating image data creates a first type of fingering data which represents a first type of finger image having a first length and not having a nail mark to be exhibited for indicating a note designating key to be depressed, while said step of creating image data further creates a second type of fingering data which represents a second type of finger image having a second length which is greater than said first length and having a nail mark to be exhibited for indicating a note designating key to be released.

12. A method for creating fingering guidance as claimed in claim 11, wherein said step of creating image data further creates a third type of fingering data which represents a third type of finger image having a third length which is greater than said first length and is less than said second length to be exhibited a predetermined time length in advance to the exhibition of said first type of finger image and to the exhibition of said second type of finger image.

13. A storage medium storing a program that is executable by a computer for creating fingering guidance in playing a musical instrument having note designating keys, the program comprising:
a module for providing performance data representing a sequence of notes which constitute a length of musical performance;
a module for creating fingering data representing fingers to be used for operating keys among said note designating keys to designate the respective ones of said sequence of notes based on analysis of said performance data;
a module for creating image data representing fingering images which include said fingers to be used for operating keys for said sequence of notes; and
a module for displaying said images of the fingers to be used for said sequence of notes based on said image data.

14. A storage medium as claimed in claim 13, wherein each of said fingering images includes:
a key range image depicting a range of said note designating keys;

a hand image depicting a shape of a hand to be located at a position as determined based on said performance data representing a note to be played among said sequence of notes and on said fingering data; and a finger image depicting a shape of a finger to be placed between the note designating a key corresponding to a note to be played in said range of the keys and said shape of the hand based on said fingering data.

15. A storage medium as claimed in claim 13, wherein the program further comprising:

a module for advancing said performance data for analysis according to progression of the performance.

16. A storage medium as claimed in claim 13, wherein said module for creating fingering data is to analyze said performance data fraction by fraction of said length of musical performance and to create said fingering data for every fractional length of said musical performance, said analysis and creation needing a certain length of time for said fractional length of the musical performance; and wherein the program further comprising:

a module for delaying said performance data for said fractional length of said musical performance by an amount of time equal to said certain length of time needed; and a module for generating tone signals for said fractional length of said musical performance based on said delayed performance data.

17. A storage medium as claimed in claim 13, wherein said module for creating image data is to create a first type of fingering data which represents a first type of finger image having a first length and not having a nail mark to be exhibited for indicating a note designating key to be depressed, while said module for creating image data is to further create a second type of fingering data which represents a second type of finger image having a second length which is greater than said first length and having a nail mark to be exhibited for indicating a note designating key to be released.

18. A storage medium as claimed in claim 17, wherein said module for creating image data is to further create a third type of fingering data which represents a third type of finger image having a third length which is greater than said first length and is less than said second length to be exhibited a predetermined time length in advance to the exhibition of said first type of finger image and to the exhibition of said second type of finger image.

* * * * *